(No Model.)
H. A. SENS.
TAILOR'S SQUARE.
No. 389,327. Patented Sept. 11, 1888.
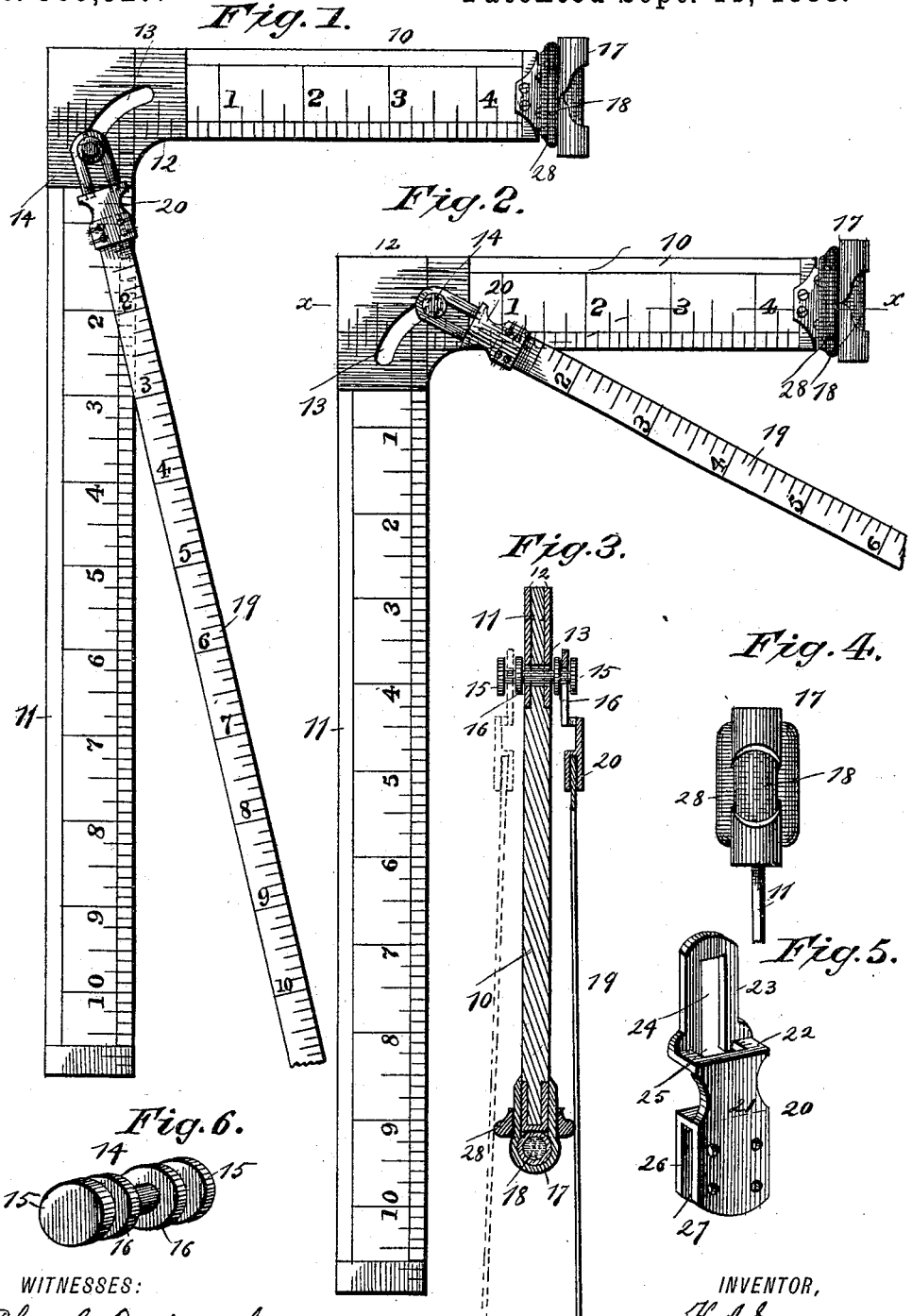
WITNESSES:
Phil. C. Dietrich.
C. Sedgwick.
INVENTOR,
H. A. Sens,
BY
Munn & Co.
ATTORNEY.

UNITED STATES PATENT OFFICE.

HERMAN A. SENS, OF CINCINNATI, OHIO.

TAILOR'S SQUARE.

SPECIFICATION forming part of Letters Patent No. 389,327, dated September 11, 1888.

Application filed May 9, 1888. Serial No. 273,267. (No model.)

*To all whom it may concern:*

Be it known that I, HERMAN A. SENS, of Cincinnati, in the county of Hamilton and State of Ohio, have invented a new and Improved Tailor's Square, of which the following is a full, clear, and exact description.

My invention relates to an improved square specially adapted for use by merchant tailors, dress and mantua makers, and has for its object to provided an instrument whereby the essential lines of a garment may be absolutely and correctly established, and wherein measures may be taken from the true angle of a square in any direction.

The invention consists in the construction and arrangement of parts, as will be hereinafter fully described, and pointed out in the claims.

Reference is to be had to the accompanying drawings, forming a part of this specification, in which similar figures of reference indicate corresponding parts in all the views.

Figures 1 and 2 are side elevations of the square, illustrating the attached tape in the several positions. Fig. 3 is a section on line x x of Fig. 2. Fig. 4 is a plan view of the level attachment. Fig. 5 is a perspective detail view of the tape-ferrule, and Fig. 6 is a perspective view of the stud whereby the tape-measure is secured to the square.

In carrying out the invention the square consists, primarily, of one short arm, 10, and a larger arm, 11, the two arms being of equal width and stayed or strengthened at the angle of intersection by the usual brass plates, 12, one applied to each side, as best shown in Fig. 3. The inner edges of the plates between the arms of the square are preferably concave, as best shown in Figs. 1 and 2. This curvature is provided in order that the square will fit snugly beneath the arms of the person to be measured.

At the intersection of the arms 10 and 11 a segmental slot, 13, is produced in the base of the metal plates 12, which slot extends through from side to side. The slot 13 is so located that the longitudinal center of the slot in the line joins the inner to the outer angle of the square. In the said slot 13 a stud or pin, 14, is adapted to travel, which stud is provided with a head, 15, upon each projecting end and a collar, 16, at each side of the center, the said collars serving as guides for the pin in its movement in the slot, at the same time preventing the displacement of the stud from the slot.

The arms of the square are divided into spaces representing inches and the fractions thereof. Each spacing upon each arm commences with the inner angle of the square and terminates, preferably, at the extremities.

Upon the extremity of the short arm of the square a case, 17, is mounted, adapted to contain a spirit-vial, 18, whereby a level is connected with the square, enabling the operator in the process of measuring to accurately establish the plumb-line beneath the arm at the breast, which line in the present system of measuring is merely a matter of guess-work.

The tape 19, employed in connection with the square, is provided at one end with an attached metal ferrule, 20, the same consisting of a strip of metal stamped, forged, or otherwise manipulated to produce a body, 21, having a downwardly-projecting flange, 22, and a lip, 23, parallel with the body, which lip is provided with a longitudinal slot, 24, intersecting a wider slot, 25, cut transversely in the flange 22. Upon the under side of the body, at the opposite end, an angular projection, 26, is formed, the horizontal member of which projection is parallel with the body, forming a pocket, 27, open at the sides and end. In the pocket 27 one end of the tape-measure is secured by rivets, stitches, or other approved or equivalent means.

To attach the measure to the square, the body of the ferrule to the rear of the flange 22 is brought over the head of the stud 14 and drawn toward the operator, whereupon the said stud-head, passing through the slot 25 in the flange, will permit the stud to slide in the slot 24, as shown in Figs. 1 and 2. The tape-measure may now be readily manipulated in connection with the square, as the segmental slot 13 and the stud sliding in said slot will permit the tape being carried in the direction of either arm of the square or within or outside the arms, as desired. The tape when thus used in conjunction with the square is mathematically correct, as when the stud is at either end of the slot in the angle of the square the divisions upon the attached tape will register with the similar divisions upon the arms of the square.

In order that the vial 18 will not break when the square is thrown upon the table, floor, or other hard surface, an elastic cushion, 28, is attached to the vial-holder, adapted to project at each side a distance beyond the vial-shell.

If in practice it is found desirable, the slot in the square may be dispensed with and the stud be rigidly attached to the center at the inner angle of said square to project outward from each side of the same.

Having thus described my invention, what I claim as new, and desire to secure by Letters Patent, is—

1. The combination, with a square provided with a slot crossing the line joining the inner to the outer angle thereof, of a stud or pin extending through and held to travel in said slot, as and for the purpose specified.

2. The combination, with a square provided with a slot at the inner angle thereof and a stud or pin extending through and held to travel in said slot, of a level attached to one arm of the square, substantially as and for the purpose specified.

3. The combination, with a square provided with a slot at the inner angle thereof and a stud or pin extending through and held to travel in said slot, of a level secured to the extremity of the shorter arm and a flexible cushion surrounding said level, substantially as and for the purpose specified.

4. The combination, with a square provided with a slot at the inner angle thereof and a pin or stud extending through and held to slide in said slot, of a detachable ferrule carried by said pin or stud and a tape-measure secured to said ferrule, substantially as shown and described.

HERMAN A. SENS.

Witnesses:
WM. HAUER,
JOHN MILLER, Jr.